United States Patent
Vaidya

(10) Patent No.: US 9,858,165 B2
(45) Date of Patent: Jan. 2, 2018

(54) METHOD AND APPARATUS FOR DESIGNING VISION BASED SOFTWARE APPLICATIONS

(71) Applicant: KPIT CUMMINS INFOSYSTEMS LTD., Pune (IN)

(72) Inventor: Vinay G. Vaidya, Pune (IN)

(73) Assignee: KPIT CUMMINS INFOSYSTEMS, LTD., Pune (IN)

( * ) Notice: Subject to any disclaimer, the term of this patent is extended or adjusted under 35 U.S.C. 154(b) by 333 days.

(21) Appl. No.: 14/426,976

(22) PCT Filed: Sep. 10, 2013

(86) PCT No.: PCT/IN2013/000548
§ 371 (c)(1),
(2) Date: Mar. 9, 2015

(87) PCT Pub. No.: WO2014/045304
PCT Pub. Date: Mar. 27, 2014

(65) Prior Publication Data
US 2015/0286468 A1 Oct. 8, 2015

(30) Foreign Application Priority Data
Sep. 10, 2012 (IN) .......................... 2620/MUM/2012

(51) Int. Cl.
*G06F 9/44* (2006.01)
*G06F 11/34* (2006.01)
*G06F 11/36* (2006.01)

(52) U.S. Cl.
CPC ...... *G06F 11/3409* (2013.01); *G06F 11/3684* (2013.01); *G06F 2201/865* (2013.01)

(58) Field of Classification Search
None
See application file for complete search history.

(56) References Cited

U.S. PATENT DOCUMENTS 6,931,633 B1 * 8/2005 Vazquez ............... G06F 9/4443
714/E11.195
7,383,536 B1 * 6/2008 Petry, III .............. G06T 1/0007
717/100

(Continued)

OTHER PUBLICATIONS

Moore, "A real-world system for human motion detection and tracking," ACM, Jun. 5, 2003.*

(Continued)

*Primary Examiner* — Insun Kang
(74) *Attorney, Agent, or Firm* — Foley & Lardner LLP

(57) ABSTRACT

The present invention provides a method and apparatus for designing vision based software applications. In one embodiment, a media file generation module (108) automatically generates a plurality of media objects from input media content by applying different values of a set of parameters to the input media content. The plurality of media content contains information representing distinct real life scenarios and distinct environmental conditions. A performance evaluation module (110) processes each of the plurality of media objects using a vision based software application and evaluates performance of the vision based software application for each of the plurality of media objects based on the processing of the plurality of media objects. An application re-designing module (126) re-designs at least one module of the vision based software application based on the evaluated performance so that the vision based software application performs optimally in distinct real life scenarios and environmental conditions.

16 Claims, 7 Drawing Sheets

(56) References Cited

U.S. PATENT DOCUMENTS

| | | | | |
|---|---|---|---|---|
| 7,962,898 B1* | 6/2011 | Petry | ................. | G06K 9/00979 |
| | | | | 717/124 |
| 9,536,322 B1* | 1/2017 | Smith | ................. | G06K 9/4652 |
| 2003/0200533 A1* | 10/2003 | Roberts | ................. | G06N 5/02 |
| | | | | 717/124 |
| 2004/0090439 A1* | 5/2004 | Dillner | ................. | G06K 9/00402 |
| | | | | 345/440 |
| 2004/0221238 A1* | 11/2004 | Cifra | ................. | G05B 19/0426 |
| | | | | 715/762 |
| 2006/0004874 A1* | 1/2006 | Hutcheson | ................. | A63F 13/34 |
| 2006/0095890 A1* | 5/2006 | Reeves | ................. | H04Q 3/0054 |
| | | | | 717/100 |
| 2007/0168943 A1* | 7/2007 | Marini | ................. | G06F 8/34 |
| | | | | 717/108 |
| 2008/0065287 A1* | 3/2008 | Han | ................. | A01B 69/007 |
| | | | | 701/28 |
| 2008/0120548 A1* | 5/2008 | Morita | ................. | G06F 3/038 |
| | | | | 715/717 |
| 2009/0307634 A1* | 12/2009 | Strandell | ................. | G09G 5/00 |
| | | | | 715/863 |
| 2010/0049341 A1* | 2/2010 | Davis | ................. | G05B 19/0421 |
| | | | | 700/83 |
| 2011/0289029 A1 | 11/2011 | Bisdikian et al. | | |
| 2012/0079456 A1* | 3/2012 | Kannan | ................. | G06F 8/77 |
| | | | | 717/124 |
| 2013/0125044 A1* | 5/2013 | Saylor | ................. | G05B 19/409 |
| | | | | 715/785 |
| 2013/0263091 A1* | 10/2013 | Neogi | ................. | G06F 9/5061 |
| | | | | 717/126 |
| 2016/0188831 A1* | 6/2016 | Kurtz | ................. | A61B 3/10 |
| | | | | 705/2 |

OTHER PUBLICATIONS

Enzweiler, "Compound modules for vision-based pedestrian recognition," Dissertation, 2011.*

Zhai et al., A line drawings degradation model for performance characterization, IEEE, 2003.*

Kancharla et al., "Edge based Segmentation for Pedestrian Detection using NIR Camera," IEEE, 2011.*

Jian Zhai et al; "A Line Drawings Degradation Model for Performance Characterization", Aug. 3, 2003, pp. 1020-1024.

Tarun Kancharla et al; "Edge Based Segmentation for Pedestrian Detection Using NIR Camera", Nov. 3, 2011, pp. 1-6.

* cited by examiner

METHOD AND APPARATUS FOR DESIGNING VISION BASED SOFTWARE APPLICATIONS

CROSS-REFERENCE TO RELATED PATENT APPLICATIONS

This application is a U.S. National Stage Application that claims priority under 35 U.S.C. §371 to International Patent Application No. PCT/IN2013/000548, filed on Sep. 10, 2013, which claims the benefit of and priority to Benefit is claimed to Indian Provisional Application No. 2620/MUM/2012, filed on Sep. 10, 2012, both of which are herein incorporated by reference in their entireties.

FIELD OF THE INVENTION

The present invention generally relates to the field of computer vision, and more particularly relates to designing vision based software applications.

BACKGROUND OF THE INVENTION

A software application is designed to perform a specific task and is expected to perform the specific task with maximum accuracy. If the input data for the software application is perfect, then the output of the software application has to be accurate. Practically, the input data would have random variations and imperfections. Any software application deployed for use in real life environment is subject to variations in environmental parameters. Such variation may severely impact, the performance of the software application. For example, environmental parameters such as rain, snow, fog, dust, low light, camera parameters can effect a pedestrian detection software application.

Prior to deployment of a software application, the software application needs to be tested to check whether the software application meets the requirements. However, testing of the software application is time consuming and a cumbersome activity. The current test environment can test the software application with standard input data which is different as compared to input data in a real life environment. Consequently, the software application which has passed the test in the testing environment may not necessarily perform accurately when deployed in a real life environment.

BRIEF DESCRIPTION OF THE ACCOMPANYING DRAWINGS

The drawings described herein are for illustration purposes only and are not intended to limit the scope of the present disclosure in any way.

DETAILED DESCRIPTION OF THE INVENTION

The present invention provides a method and system for designing vision based software applications. In the following detailed description of the embodiments of the invention, reference is made to the accompanying drawings that form a part hereof, and in which are shown by way of illustration specific embodiments in which the invention may be practiced. These embodiments are described in sufficient detail to enable those, skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
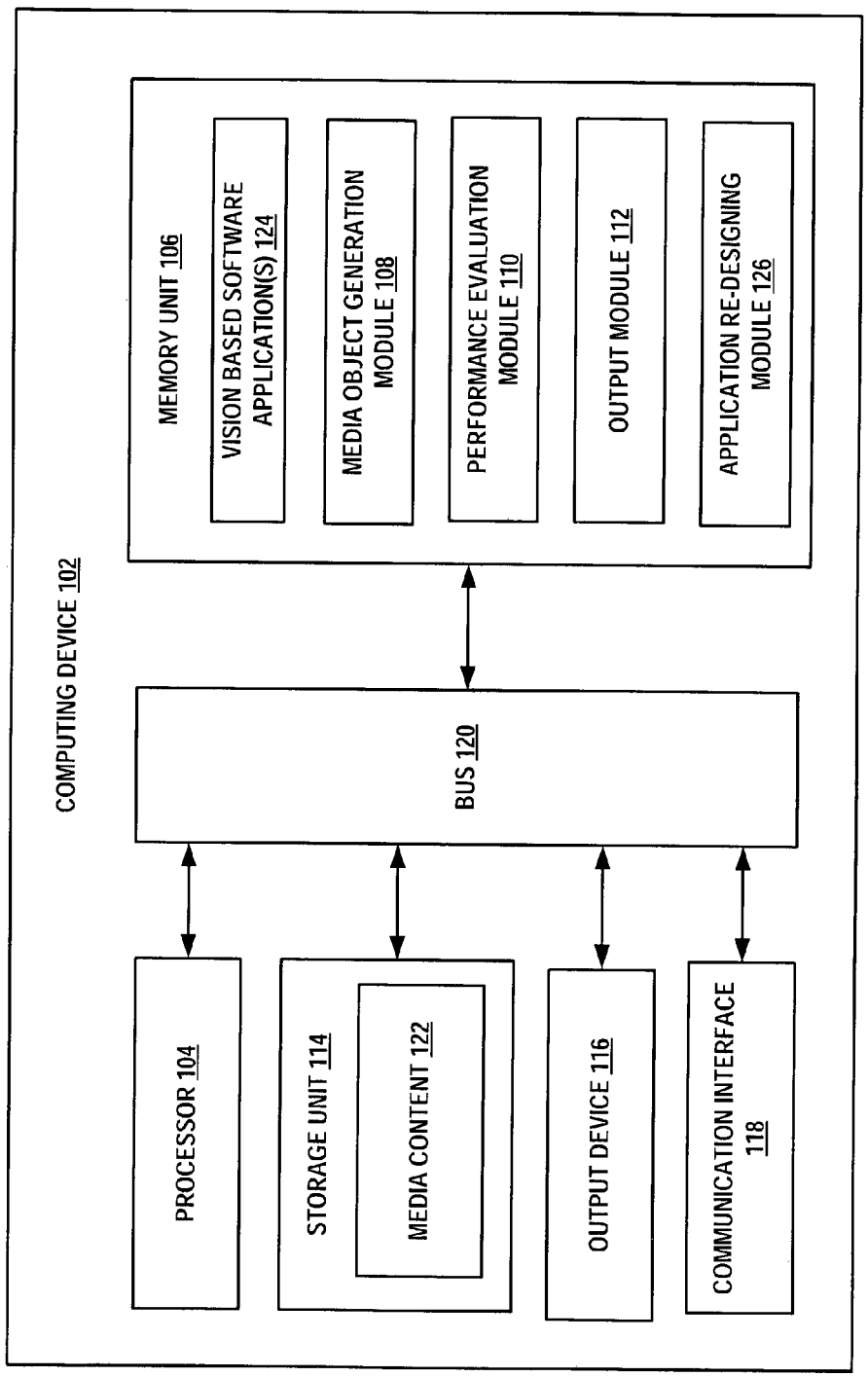
FIG. 1 is a block diagram illustrating an exemplary computing device configured for designing a robust vision based software application, according to one embodiment.

FIG. 1 is a block diagram illustrating an exemplary computing device 102 configured for designing a robust vision based software application, according to one embodiment. The computing device 102 includes a processor 104, a memory unit 106, a storage unit 114, an output device 116 and a communication interface 118 coupled to a bus 120.

The processor 104 may be configured to implement functionality and/or process instructions for execution within the computing device 102. The processor 104 may be capable of processing instructions stored in the memory unit 106 or instructions stored on the storage unit 114. The processor 104 may include any one or more of a processor, a controller, a digital signal processor (DSP), an application specific integrated circuit (ASIC), a field-programmable gate array (FPGA), or equivalent discrete or integrated logic circuitry. Additionally, the functions attributed to the processor 104, in this disclosure, may be embodied as software, firmware, hardware or any combination thereof.

The memory unit 106 may be configured to store information within the computing device 102 during operation. The memory unit 106 may, in some examples, be described as a computer-readable storage medium. The memory unit 106 may be described as a volatile memory, meaning that the memory does not maintain stored contents when the computing device 102 is turned off. Examples of volatile memories include random access memories (RAM), dynamic random access memories (DRAM), static random access memories (SRAM), and other forms of volatile memories known in the art. In some examples, the memory unit 106 may be used to store program instructions for execution by the processor 104.

For example, the memory unit 106 includes a media object generation module 108, a performance evaluation module 110, an output module 112 and an application re-designing module 126 stored in the form of program instructions for execution by the processor 104. The media object generation module 108, the performance evaluation module 110, the output module 112 and/or the application re-designing module 126 can be implemented as software, hardware, or some combination of software and hardware. For example, the media object generation module 108, the performance evaluation module 110, the output module 112 and/or the application re-designing module 126 could be implemented as a part of an application specific integrated circuit (ASIC). The memory unit 106 contains one or more vision based software application(s) 124 whose performance is to be evaluated under real life scenarios and environmental conditions.

According to one embodiment, the media object generation module 108 is configured for automatically generating a plurality of media objects (image or video) from input media content by applying different values of a set of parameters to the input media content (pre-stored image(s)/ video or streaming video). It can be noted that, the plurality of media objects contains information representing distinct real life scenarios and environmental conditions. For example, the distinct real life scenarios and environmental conditions may include but not limited to different lighting conditions, different times of the day and different times of the night, different weather conditions, various naturally occurring disturbances (e.g., radiations, magnetic fields, etc.).

In one embodiment, the performance evaluation module 110 is configured for processing each of the plurality of media objects using modules of the vision based software application 124 stored in the memory unit 106 and evaluating performance of each of the modules of the vision based software application 124 based on the processing of the plurality of media objects by the respective modules. The output module 112 is configured for outputting the evaluated performance of the modules of the vision based software application. The application re-designing module 126 is configured for re-designing one or more of the modules of the vision based software application based on the evaluated performance of the modules such that the performance of the vision based software application becomes optimal for all the distinct real life scenarios and environmental conditions, thereby making the vision based software application robust against all the distinct real life scenarios and environmental conditions.

In another embodiment, the computing device 102 is configured for evaluating performance of a plurality of vision based software applications 124. In such case, the performance evaluation module 110 is configured for processing each of the plurality of media objects using each of the vision based software applications 124 stored in the memory unit 106 and evaluating performance of each of the vision based software applications 124 based on the processing of the plurality of media objects by the respective vision based software applications 124. The performance evaluation module 110 is configured for determining a vision based software application whose performance in all the distinct real life scenarios and environmental conditions is evaluated as optimal among all the plurality of the vision based software applications 124. The output module 112 is configured for outputting the identified vision based software application on a display of the computing device 102. The detailed functionalities of the modules 108, 110, 112 and 126 are explained in description of FIGS. 2, 5 and 6.

The storage unit 114 may include one or more computer-readable storage media. The storage device 114 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage device 114 may, in some examples, be considered a non-transitory storage medium. The term "non-transitory" may indicate that the storage medium is not embodied in a carrier wave or a propagated signal. However, the term "non-transitory" should not be interpreted to mean that the storage device 114 is non-movable. In some examples, the storage device 114 may be configured to store larger amounts of information than the memory unit 106. In certain examples, a non-transitory storage medium may store data that can, over time, change (e.g., in Random Access Memory (RAM) or cache). As shown, the storage unit 114 includes the media content 122 which may be an image or video. Alternatively, the media content 122 may be streaming video in which case the video is streamed over the Internet.

The communication interface 118 may be used to transmit or receive instructions over a network using a bus 120 coupled to the communication interface 118. The communication interface 118 may be a part of the processor 104 or may be a separate component. The communication interface 118 may be created in software or may be a physical connection in hardware. The communication interface 118 may be configured to connect with a network, external media, a display or any other component in the system, or in combinations thereof.

Figure 2:
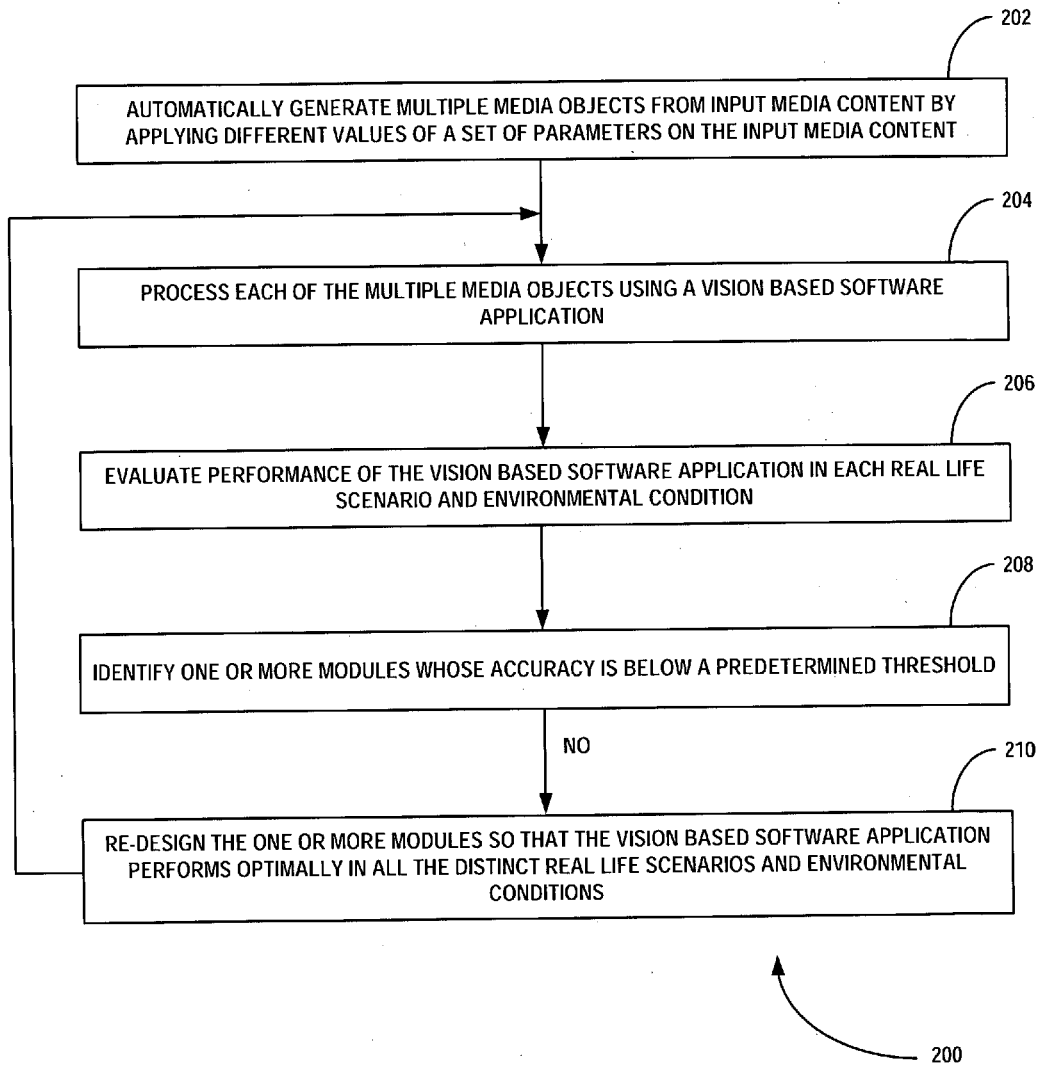
FIG. 2 is a process flowchart illustrating an exemplary method of designing a robust vision based software application, according to one embodiment.

FIG. 2 is a process flowchart 200 illustrating an exemplary method of designing a robust vision based software application, according to one embodiment. At step 202, multiple media objects are automatically generated from input media content by applying different values of a set of parameters on the input media content. For example, the media content can be pre-stored image(s)/video or streaming video. The set of parameters may include noise, brightness, contrast, blurriness and the like. In real time, these parameters severely affect the quality of image/video captured by a camera fitted on an automobile. By varying the values of the set of parameters, multiple media objects containing information representing different real life scenarios and environment conditions (e.g., rain, snowfall, fog, dust, low light, etc.) are generated from the input media content (standard video/image). For example, the input media content is synthetically changed to obtain multiple media objects by adding noise of different distributions (e.g., Gaussian, salt and pepper, uniform, and speckle), changing brightness and contrast and introducing motion blurs. For example, in case the input media content is a RGB image, parameters such as contrast can be varied by changing RGB values of pixels of the image using the following equations:

$$R_{out}=(R_{in}-0.5)*\tan((contrast+1)*(\pi/4))+0.5$$

$$G_{out}=(G_{in}-0.5)*\tan((contrast+1)*(\pi/4))+0.5$$

$$B_{out}=(B_{in}-0.5)*\tan((contrast+1)*(\pi/4))+0.5$$

where, $R_{in}$, $G_{in}$, and $B_{in}$ represent input intensity values of R, G, and B channels, and $R_{out}$, $G_{out}$, and $B_{out}$ represent intensity values of R, G, B after varying contrast. For example, the contrast in the RGB image can be varied from −0.75 to +0.75.

In some embodiments, various models associated with specific real life scenarios and environment conditions are pre-stored in a database (e.g., the storage unit 114 of FIG. 1). In these embodiments, when a particular model is selected by a user via a graphical user interface of the computing device 102, values of parameters such as noise, blurriness, brightness and contrast corresponding to the model are applied on to the standard media content to obtain real life scenario and environmental conditions for which the performance of the vision based software application is to be characterized. For example, when a model for rain and/or snow conditions with variable density and orientation of rain length, size of snowflakes is selected, the computing device 102 may synthetically change the media content to obtain rain and/or snow like conditions and variable density and orientation of rain length and size of snowflakes. In this manner, any media object depicting a real life scenario and environmental condition is obtained. Hence, the need and efforts of capturing images/videos of real life scenarios and environmental conditions or evaluating performance of a vision based software application in a road test is eliminated, thereby saving time and cost involved in capturing real life images/videos.

At step 204, each of the multiple media objects are processed using various modules of a vision based software application. In a preferred embodiment, the multiple media objects are iteratively run through the modules during processing the multiple media objects. The vision based software application is a software program, developed for use in various domains, whose performance needs to be evaluated under different real life scenarios and environmental conditions in the test environment. For example, a vision based software application developed for use in automobiles may be a driver assistance software application. The vision based software application may behave differently under different scenarios and different environmental conditions. Since each of the multiple media objects represent different real life scenario and environmental conditions, processing of the media objects by the various modules of the vision based software application would assist in performance characterization and hence, evaluation of the vision based software application. One skilled in the art would understand that the vision based software application processes the media objects in the test environment in the manner similar to processing of media objects when deployed in advanced driver safety systems mounted in automobiles.

Figure 3:
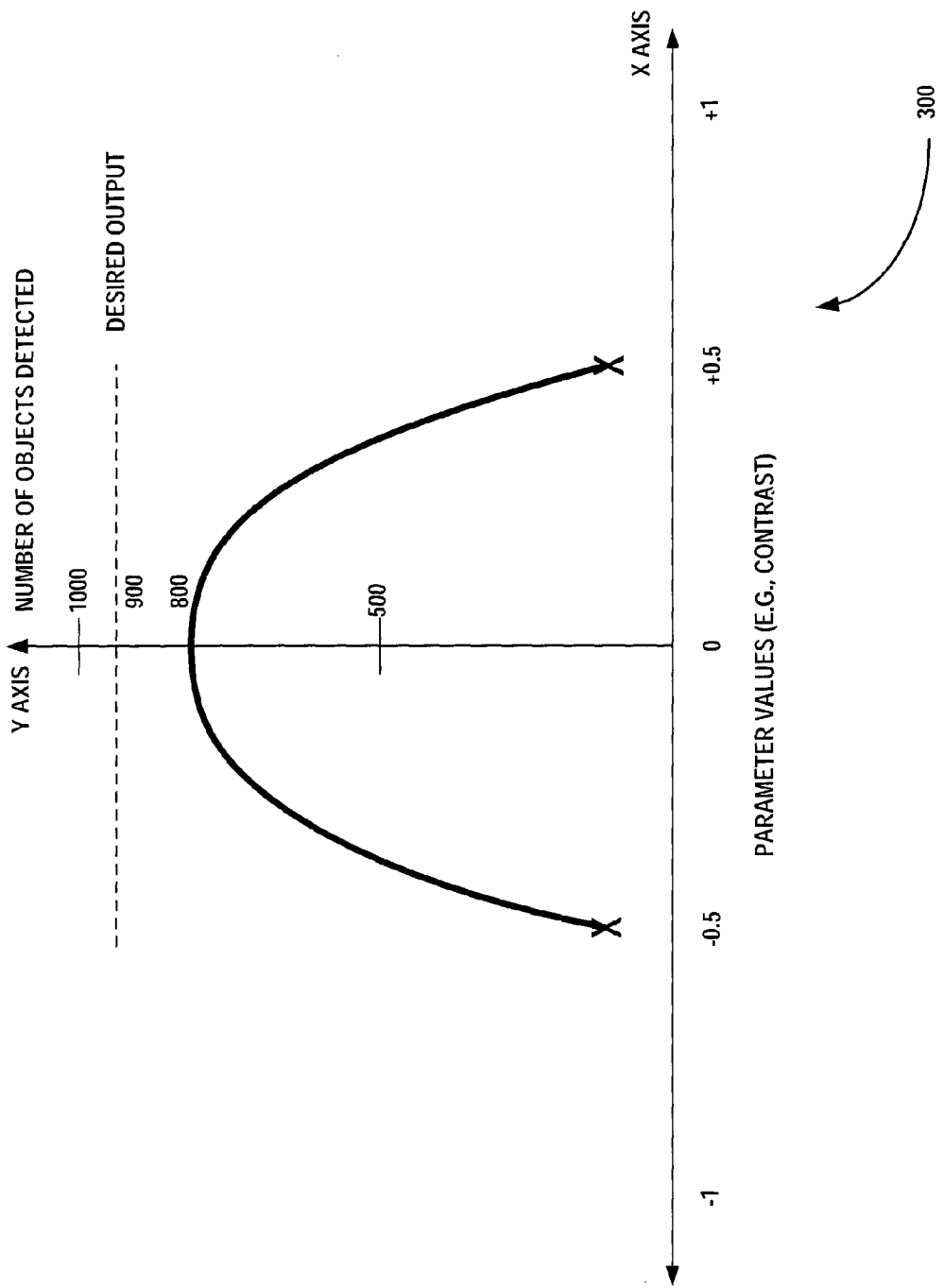
FIG. 3 is a schematic representation depicting a characterization graph of accuracy of a vision based software application versus the set of parameters.

At step 206, performance of each of the modules of the vision based software application against each real life scenario and environmental condition is evaluated based on processing of each of the input media objects. In some embodiments, a characterization graph of accuracy of each module of the vision based software application versus the set of parameters is plotted based on processing of said each of the multiple media objects. An exemplary characterization graph for a vision based software application is shown in FIG. 3. Typically, the accuracy of each module of the vision based application depends on the number of true detections and number of false detections obtained after processing each of the multiple media objects by the respective modules. For example, for a pedestrian detection vision based software application, the term 'true detection' refers to number of objects in a media object (image/video) that are accurately identified as pedestrians by the vision based software application, while the term 'false detection' refers to number of objects in the media object (e.g., image/video) that are erroneously identified as pedestrians by the vision based software application during processing of the media objects.

In order to determine whether the vision based software application performs optimally in all the distinct real life scenarios and environmental conditions, ratio of false rejection and true detections outputted by each module is plotted against variation in the set of parameter values (e.g., brightness, noise, blurriness, contrast) of corresponding media objects in the characterization graph. Thus, the characterization graph provides a precise idea of the operating region of the vision based software application with respect to the values of pre-defined set of parameters.

At step 208, one or more modules whose accuracy is below a predetermined threshold are identified from the characterization graph. The accuracy refers to number of elements detected in the distinct real life scenarios and environmental conditions. The predetermined threshold is minimum number of elements desired to be detected by each of the modules in the distinct real life scenarios and environmental conditions. At step 210, the one or more identified modules are re-designed so that the vision based software application performs optimally in all the distinct real life scenarios and environmental conditions. In one exemplary implementation, software code logic and values of code parameters associated with the one or more modules is modified till the accuracy of the respective modules becomes equal to or greater than the pre-determined threshold. The one or more modules are re-designed such that the performance of the vision based software application becomes optimal for all the distinct real life scenarios and environmental conditions, thereby making the vision based software application robust. The robust vision based software application is a software application providing optimal output in distinct real life scenarios and environmental conditions.

FIG. 3 is a schematic representation depicting a characterization graph 300 of accuracy of a vision based software application versus the set of parameters. In FIG. 3, X axis represents the number of objects detected and Y axis represents the range of values of parameters. The number of objects detected varies from 0 to 1000. The parameter values are varied between a certain range of values. It can be seen from the characterization graph 300 that, the performance of the vision based software application varies and does not remain constant over a range of parameters. The desired output of the vision based software application (i.e., number of objects detected in the image/video after processing) need to be determined for a robust vision based software application. In the instant example, the number of objects desired to be detected by the vision based software application is 900. It is important to determine whether the vision based software application is robust for the range of parameters values (+0.5 to −0.5). For example, performance of various modules of the vision based software application needs to be evaluated in distinct real life scenarios and environmental conditions and then one or more modules are to be re-designed based on the evaluation of performance of the modules as illustrated in FIG. 4.

Figure 4:
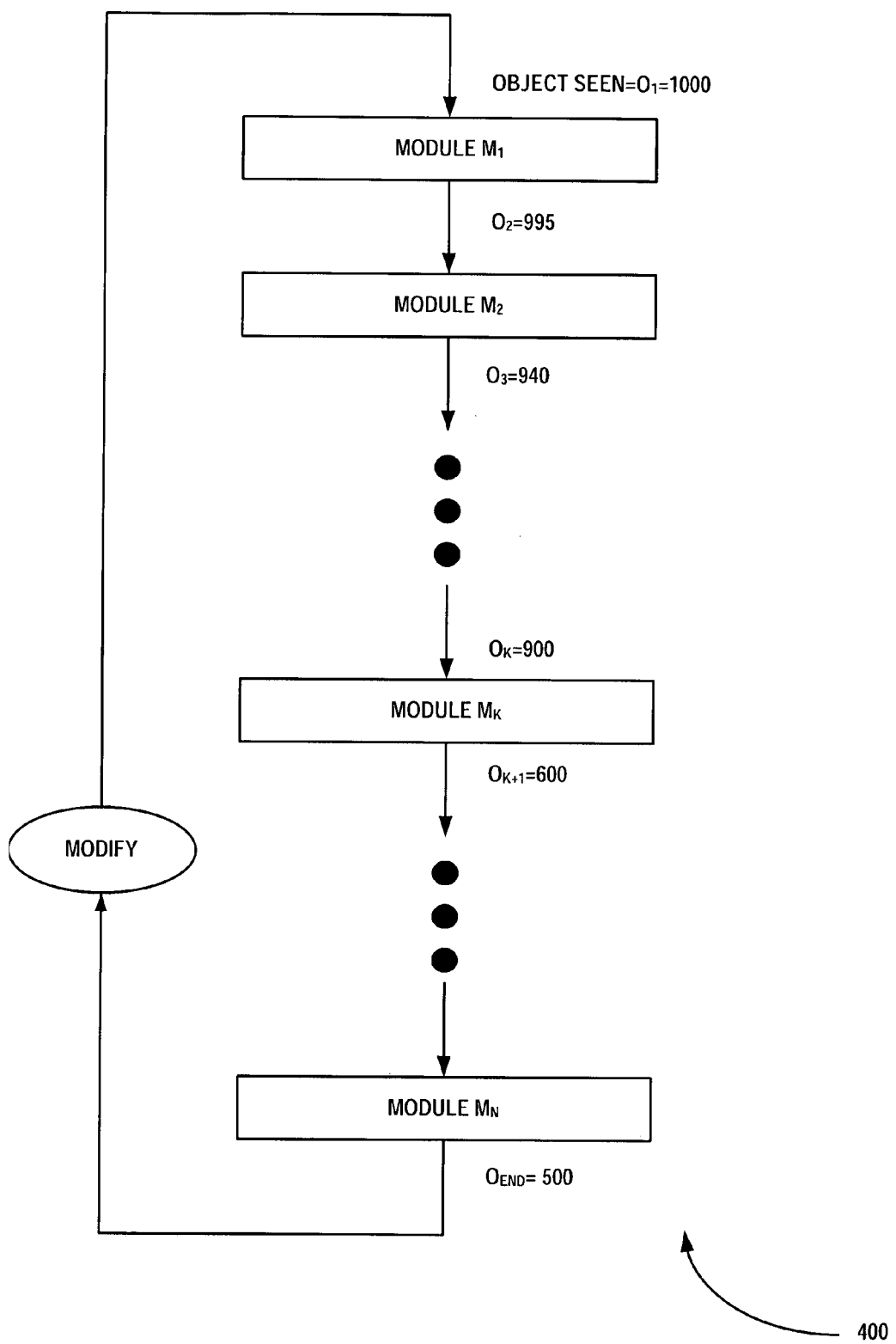
FIG. 4 is a flow diagram illustrating a process of evaluating performance of various modules of the vision based software application.

FIG. 4 is a flow diagram 400 illustrating a process of evaluating performance of various modules of the vision based software application. Typically, a vision based software application consists of a number of modules for carrying out different tasks and functions to achieve the desired output (to detect objects in the image(s)/video) with maximum accuracy. For example, a typical image processing and pedestrian detection application includes an image enhancement module, a scene recognition module, a segmentation module, a classification module and a tracking module and the objects to be detected in the image/video are pedestrians. It is to be noted that, the desired output and hence the desired objects to be identified in the image/video would vary based on the type of vision based software application.

Consider that, the vision based software application consists of 'N' modules as shown below. A media object (image/video) corresponding to a real life scenario and environmental condition is processed through the 'N' modules of the vision based software application. Consider that, the number of objects detected (visible to the naked eye) in an input image/video is 1000. When the input media object is run through the module $M_1$, the number of objects detected in the input image/video drops to 995. Thus, the accuracy of the module $M_1$ corresponds drop in objects detected in the input image/video which is equal to 995. The output of the module $M_1$ is then given as an input to the module $M_2$. At the output of the module $M_2$, the number of objects detected further drops to 940 and so on up to the module $M_k$. At the input of the module $M_k$, the number of objects detected is 900, while at the output of the module $M_K$, the number of objects detected drops to 600.

By the time the input file is run through all the modules, at the final output of the module $M_n$, the number of objects detected is reduced to 500. As can be seen, the maximum drop in the number of detected objects is found across the module $M_K$. Hence, the module $M_K$ is a target module identified and needs to be redesigned to reduce the drop in the number of objects detected in the image/video, thus increasing the accuracy and robustness of the vision based software application.

Accordingly, the module $M_K$ is redesigned by modifying software code logic and values code parameter of the module $M_K$ and the whole evaluation process of FIG. 4 is re-run. This process is repeated until the drop in number of objects detected before processing and after processing the image/video by the module is minimized. Thus, the evaluation process of FIG. 4 identifies one or more modules for which number of objects detected decreases significantly (beyond a certain set threshold), leading to decrease in accuracy and robustness of the vision based software application. All such modules are then redesigned until the drop is reduced to as minimal as possible (i.e., below a pre-determined threshold). When the drop of accuracy across all the identified modules is minimized, the vision based software application becomes robust. It is to be noted that the pre-determined threshold maybe varied based on nature of the vision based software application.

Figure 5:
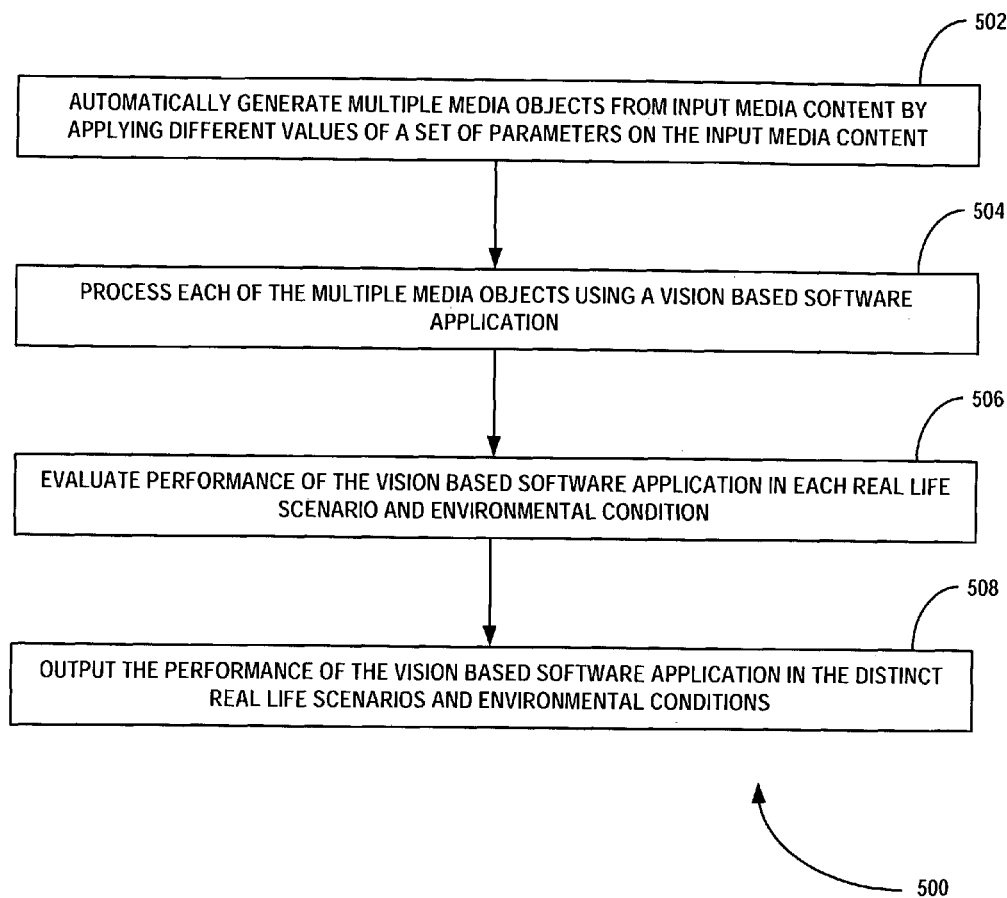
FIG. 5 is a process flowchart illustrating an exemplary method of evaluating performance of a vision based software application, according to another embodiment.

FIG. 5 is a process flowchart 500 illustrating an exemplary method of evaluating performance of a vision based software application, according to another embodiment. At step 502, multiple media objects are automatically generated from input media content by applying different values of a set of parameters on the input media content. At step 504, each of the multiple media objects are processed using a vision based software application. The vision based software application may behave differently under different scenarios and different environmental conditions. Since each of the multiple media objects represent different real life scenario and environmental condition, processing of the media objects by the vision based software application in the test environment would assist in performance characterization of the vision based software application. One skilled in the art would understand that the vision based software application processes the media objects in the test environment in the manner similar to processing of media objects when deployed in advanced driver safety systems mounted in automobiles.

At step 506, performance of the vision based software application in each real life scenario and environmental condition is evaluated based on processing of each of the input media objects. In some embodiments, a characterization graph of accuracy of the vision based software application versus the set of parameters is plotted based on processing of said each of the multiple media objects. Typically, the accuracy of the vision based application depends on the number of true detections and number of false detections obtained after processing each of the multiple media objects. For example, for a pedestrian detection vision based software application, the term 'true detection' refers to number of objects in the media object (e.g., image/video) that are accurately identified as pedestrians by the vision based software application, while the term 'false detection' refers to number of objects in the media object that are erroneously identified as pedestrians by the vision based software application during processing of the media objects. In order to determine whether the vision based software application performs optimally across all the distinct real life scenarios and environmental conditions, ratio of false rejection and true detections is plotted against variation in the set of parameter values (e.g., brightness, noise, blurriness, contrast) of corresponding media objects in the characterization graph. Thus, the characterization graph provides a precise idea of the operating region of the vision based software application with respect to the values of pre-defined set of parameters. Thus, the values of the set of parameters for which accuracy (i.e., higher number of true detections compared to false detections) of the vision based software application is maximum is determined based on the characterization graph, where the values of the set of parameters correspond to real life scenarios and environmental conditions.

At step 508, the performance of the vision based software application in the distinct real life scenario and environmental conditions is outputted. In some embodiments, the performance of the vision based software application is outputted on a graphical user interface of the computing device 102. For example, the characterization graph may be displayed on the graphical user interface of the computing device 102.

Figure 6:
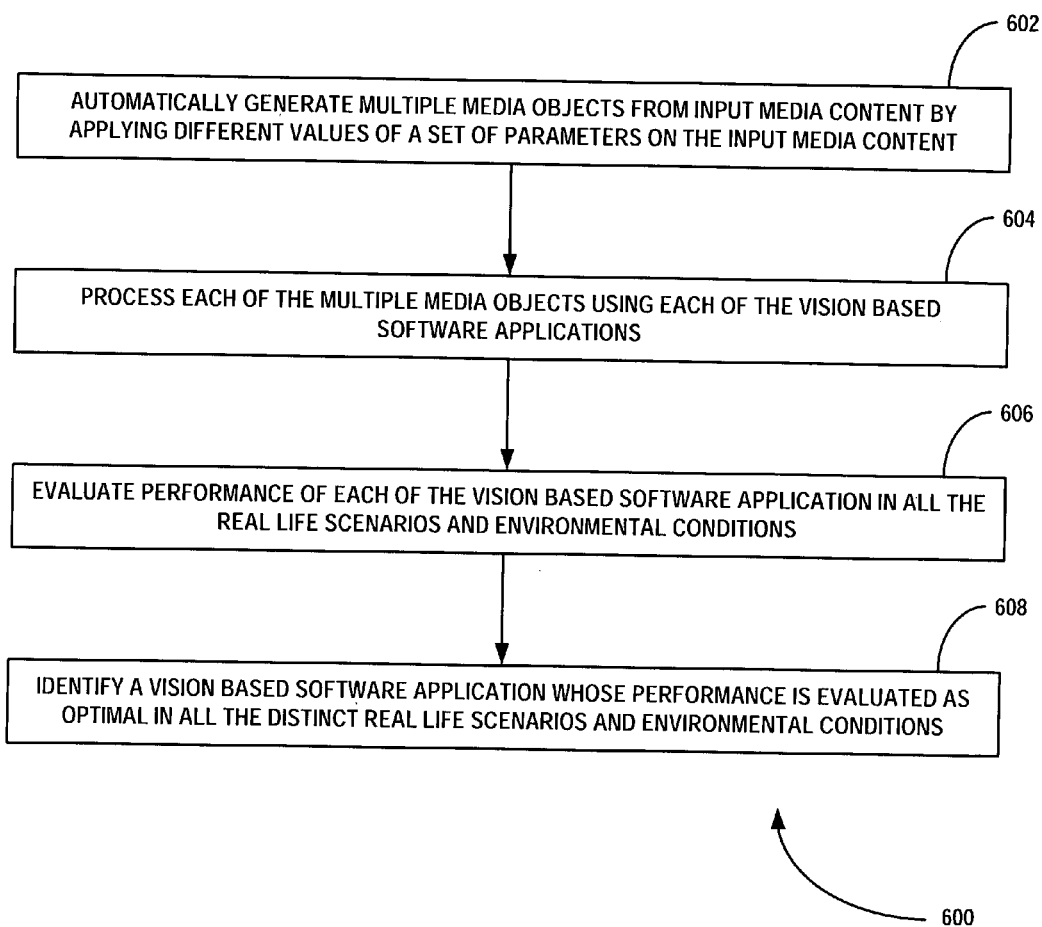
FIG. 6 is a process flowchart illustrating an exemplary method of determining a vision based software application based on optimal performance, according to yet another embodiment.

FIG. 6 is a process flowchart 600 illustrating an exemplary method of determining a vision based software application based on optimal performance, according to yet another embodiment. At step 602, multiple media objects are automatically generated from input media content by applying different values of a set of parameters on the input media content. At step 604, each of the multiple media objects are processed using different vision based software applications. One skilled in the art would understand that the vision based software application processes the media objects in the test environment in the manner similar to processing of media objects when deployed in advanced driver safety systems mounted in automobiles.

Figure 7:
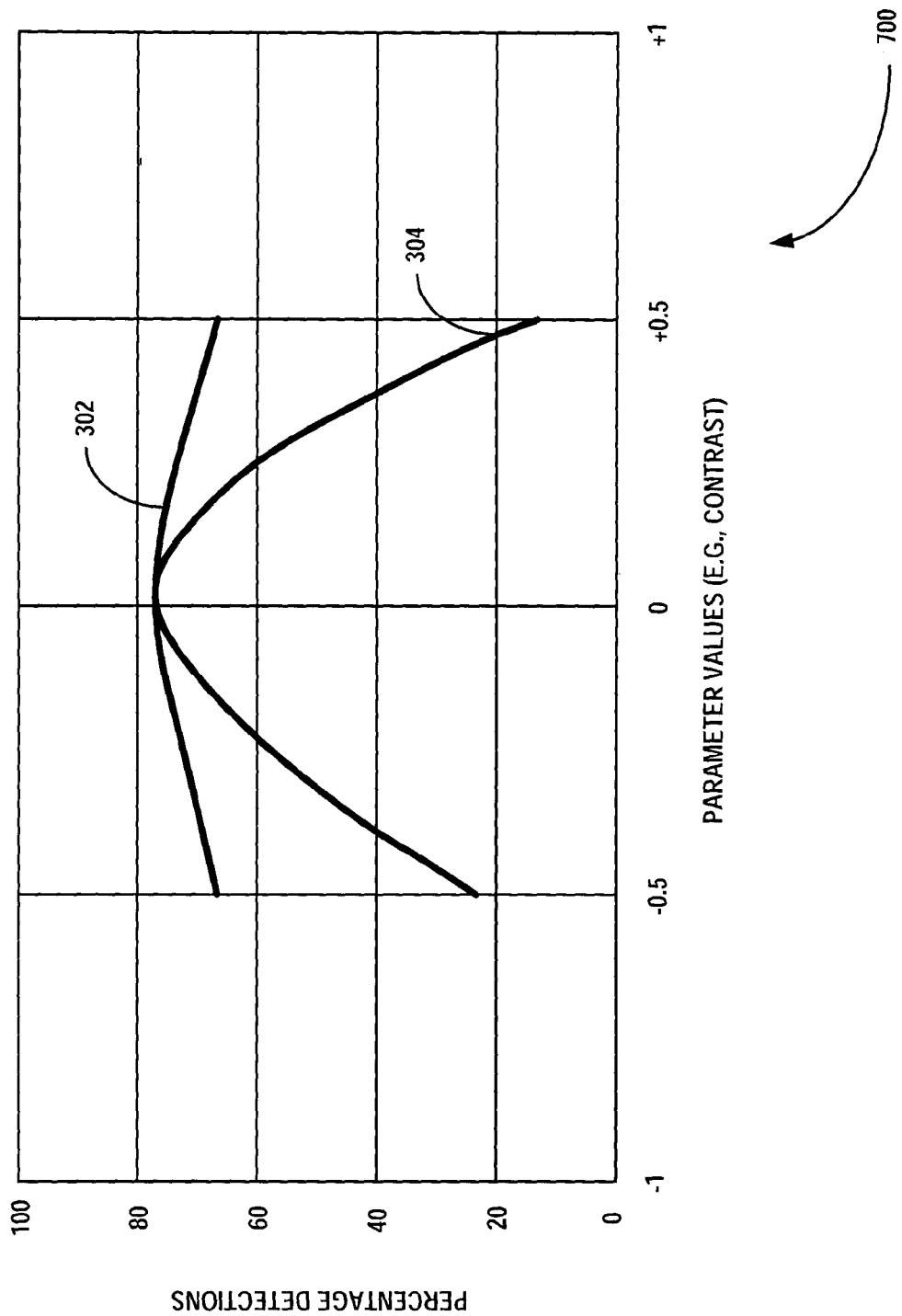
FIG. 7 is a schematic representation depicting a characterization graph of accuracy versus set of parameters for a first vision based software application and a second vision based software application.

At step 606, performance of each of the vision based software applications in all the distinct real life scenarios and environmental conditions is evaluated based on processing of each of the input media objects by the respective vision based software applications. In some embodiments, a characterization graph of accuracy of each of the vision based software applications versus the set of parameters is plotted based on processing of said each of the multiple media objects by the respective vision based software applications. An exemplary characterization graph for two vision based software applications is depicted in FIG. 7. Typically, the accuracy of each of the vision based application depends on the number of true detections and number of false detections obtained after processing each of the multiple media objects. For example, for a pedestrian detection vision based software application, the term 'true detection' refers to number of objects in a media object (e.g., image/video) that are accurately identified as pedestrians by the vision based software application, while the term 'false detection' refers to number of objects in the media object that are erroneously identified as pedestrians by the vision based software application during processing of the media objects. In order to determine whether which of the vision based software applications performs optimally across all the distinct real life scenarios and environmental conditions, ratio of false rejection and true detections is plotted against variation in the set of parameter values (e.g., brightness, noise, blurriness, contrast) of corresponding media objects in the characterization graph for each of the vision based software application. Thus, the characterization graph provides a precise idea of the operating region of the respective vision based software applications with respect to the values of pre-defined set of parameters.

At step 608, a vision based software application whose performance is evaluated as optimal in all the distinct real life scenarios and environmental conditions is identified among the plurality of vision based software applications based on the characterization graph. In one exemplary implementation, each of the vision based software applications may have a unique identifier assigned for identification among the vision based software applications. The identifier associated with the vision based software application whose performance is optimal under all the distinct real life scenarios and environmental conditions is displayed in a graphical user interface of the computing device 102. In this manner, the best possible vision based software application can be identified for deployment in Advanced Driver Safety Systems (ADAS) mounted in automobiles.

FIG. 7 is a schematic representation depicting a characterization graph 700 of accuracy versus set of parameters for a first vision based software application and a second vision based software application. The characterization graph 700 depicts a plot 702 of accuracy (i.e., percentage detections) versus set of parameters for the first vision based software application and a plot 704 of accuracy (i.e., percentage detections) versus set of parameters for the second vision based software application. It can be seen from the plots 702 and 704 that the accuracy of the first vision based software application remains fairly constant in region from −0.5 to +0.5 values, whereas, for the second vision based software application, the accuracy of the second vision based software application falls off drastically on both sides from peak value of approximately 70 percent. Based on the characterization graph 700, the computing device 102 evaluates the performance of the first vision based software application and the second vision based software application. Since the performance of the first vision based software application is better than the second vision based software application, the computing device 102 identifies the first vision based software application as suitable for real life scenario and environmental conditions for which the first vision based software application and the second vision based software application were tested.

One skilled in art can envision that, the present invention can be modified to characterize performance of software applications in various domains. For example, for a serial to parallel code converter, multiple models are created in each domain by varying set of parameters such as number of threads or cores, hyper-threads enabled or disabled, granularity and complexity level of a code, parallelizability of the code, number of loops, etc. These parameters are then quantified to characterize performance of the serial to parallel code converter application. One skilled in the art will understand that the present invention provides a convenient and faster designing of robust software applications by dynamically subjecting input media content to changing real life scenarios and conditions. It is to be noted that the set of parameters is not limited to the examples provided in the disclosure and that the embodiments of the present invention may use a range of parameters based on various vision based software applications. As mentioned above, multiple set of parameters may be configured for applications of different domains. Additionally, a single parameter or multiple sets of parameters may be synthetically varied based on requirement.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardwire, firmware, and/or software embodied in a machine readable medium. For example, the various electrical structure and methods may be embodied using transistors, logic gates, and electrical circuits, such as application specific integrated circuit.

We claim:

1. A method of modifying one or more of a plurality of modules of a vision based software application configured to process input representing at least one of images or video of an environment to generate an output, the method comprising:

automatically generating, using a processor, a plurality of media objects from input media content by varying a set of parameters to generate different values of the set of parameters and applying the different values of the set of parameters to the input media content, wherein the plurality of media objects contain information representing a plurality of distinct scenarios and environmental conditions;

processing, using the processor, each of the plurality of media objects using the plurality of modules of the vision based software application and generating, for each of the plurality of media objects, output data for each of the plurality of modules;

automatically evaluating, using the processor, performance of each of the plurality of modules of the vision based software application under the plurality of distinct scenarios and environmental conditions and calculating performance data indicating the performance based on the output data of each of the plurality of modules, the evaluating comprising generating a characterization graph indicating an accuracy of each of the plurality of modules across the set of parameters based on the output data of the plurality of modules and identifying at least one of the plurality of modules having an accuracy below a pre-determined threshold based on the characterization graph; and modifying, using the processor, the at least one of the plurality of modules of the vision based software application based on the evaluation of the performance and calculation of the performance data indicating the performance of the plurality of modules.

2. The method of claim 1, wherein the different values of the set of parameters correspond to different ones of the plurality of distinct scenarios and environmental conditions.

3. The method of claim 2, wherein processing each of the plurality of media objects using the plurality of modules of the vision based software application comprises iteratively processing the plurality of media objects through each of the plurality of modules of the vision based software application.

4. The method of claim 1, wherein modifying the at least one of the plurality of modules of the vision based software application comprises modifying software code logic and values of code parameters associated with the at least one of the plurality of modules.

5. The method of claim 4, wherein modifying the software code logic and values of code parameters associated with the at least one of the plurality of modules comprises modifying the software code logic and values of code parameters associated with the at least one of the plurality of modules and recalculating the performance data until the performance data indicates the accuracy of the at least one of the plurality of modules is equal to or greater than the pre-determined threshold.

6. The method of claim 1, wherein the input media content comprises one of an image, a set of images, a pre-recorded video, or streaming video.

7. A method of evaluating performance of a vision based software application configured to process input representing at least one of images or video of an environment to generate an output, comprising:
automatically generating, using a processor, a plurality of media objects from input media content by varying a set of parameters to generate different values of the set of parameters and applying the different values of the set of parameters to the input media content, wherein the plurality of media objects contain information representing a plurality of distinct scenarios and environmental conditions;
processing, using the processor, each of the plurality of media objects using the vision based software application and generating, for each of the plurality of media objects, output data for the vision based software application;
automatically evaluating, using the processor, performance of the vision based software application under the plurality of distinct scenarios and environmental conditions and calculating performance data indicating the performance based on the output data, the evaluating comprising generating a characterization graph indicating an accuracy of the vision based software application across the set of parameters based on the output data for the vision based software application and identifying at least one module of the vision based software application having an accuracy below a predetermined threshold based on the characterization graph;
automatically outputting the performance data; and
re-designing the at least one module based on the evaluation of the performance and calculation of the performance data.

8. The method of claim 7, wherein the different values of the set of parameters correspond to different ones of the plurality of distinct scenarios and environmental conditions.

9. The method of claim 7, wherein outputting the performance data comprises displaying the characterization graph indicating the accuracy of the vision based software application across the set of parameters.

10. A method of selecting a vision based software application from among a plurality of vision based software applications configured to process input representing at least one of images or video of an environment to generate an output, the method comprising:
automatically generating, using a processor, a plurality of media objects from input media content by varying a set of parameters to generate different values of the set of parameters and applying the different values of the set of parameters to the input media content, wherein the plurality of media objects contain information representing a plurality of distinct scenarios and environmental conditions;
processing, using the processor, each of the plurality of media objects using the plurality of vision based software applications and generating output data for each of the plurality of vision based software applications;
automatically evaluating, using the processor, performance of each of the plurality of vision based software applications under the plurality of distinct scenarios and environmental conditions and calculating performance data indicating the performance based on the output data for each of the plurality of vision based software applications, the evaluating comprising generating a characterization graph indicating an accuracy of each of the plurality of vision based software applications across the set of parameters based on the output data for each of the plurality of vision based software applications and identifying at least one of the plurality of vision based software applications having an accuracy below a pre-determined threshold based on the characterization graph; and
selecting and re-designing the at least one of the plurality of vision based software applications based on the evaluation of the performance and calculation of the performance data indicating the performance of the plurality of vision based software applications.

11. The method of claim 10, wherein the different values of the set of parameters correspond to different ones of the plurality of distinct scenarios and environmental conditions.

12. An apparatus comprising:
a processor; and
a memory unit coupled to the processor, wherein the memory unit comprises instructions including:
a media object generation module configured to automatically generate a plurality of media objects from input media content by varying a set of parameters to generate different values of the set of parameters and applying the different values of the set of parameters to the input media content, wherein the plurality of media objects contain information representing a plurality of distinct scenarios and environmental conditions; and
a performance evaluation module configured to:
process each of the plurality of media objects using the vision based software application and generate, for each of the plurality of media objects, output data for the vision based software application; and
evaluate performance of the vision based software application and calculate performance data indicating the performance based on the output data, wherein in evaluating the performance of the vision based application based on processing of the plurality of media objects, the performance evaluation module is configured to evaluate the performance of the vision based software application under the plurality of distinct scenarios and environmental conditions and calculate the performance data by: generating a characterization graph indicating an accuracy of the vision based software application across the set of parameters based on the output data for the vision based software application and identifying at least one module of the vision based software application having an accuracy below a pre-determined threshold based on the characterization graph; and an application re-designing module configured to modify the at least one module of the vision based software application based on the evaluation of the performance and calculation of the performance data.

13. The apparatus of claim 12, wherein the memory unit further comprises an output module configured to output the performance data.

14. The apparatus of claim 12, wherein in modifying the at least one module of the vision based software application, the application re-designing module is configured to modify the at least one module of the vision based software application by modifying software code logic and values of code parameters associated with the at least one module.

15. An apparatus comprising:
a processor; and
a memory unit coupled to the processor, wherein the memory unit comprises instructions including:
a media object generation module configured to automatically generate a plurality of media objects from input media content by varying a set of parameters to generate different values of the set of parameters and applying the different values of the set of parameters to the input media content, wherein the plurality of media objects contain information representing a plurality of distinct scenarios and environmental conditions;
a performance evaluation module configured to:
process each of the plurality of media objects using a plurality of vision based software applications and generate, for each of the plurality of media objects, output data for the plurality of vision based software applications;
evaluate performance of each of the plurality of vision based software applications and calculate performance data indicating the performance based on the output data, wherein the performance evaluation module is configured to evaluate the performance of each of the plurality of vision based software applications under the plurality of distinct scenarios and environmental conditions and calculate the performance data by: generating a characterization graph indicating an accuracy of each of the plurality of vision based software applications across the set of parameters based on the output data for the plurality of vision based software applications and identifying at least one vision based application of the plurality of vision based software applications having an accuracy below a pre-determined threshold based on the characterization graph; and
select the at least one vision based software application from the plurality of vision based software applications based on the performance data; and
an application re-designing module configured to modify the at least one vision based software application based on the selection.

16. The apparatus of claim 15, wherein the performance evaluation module is configured to select the at least one vision based software application from among the plurality of vision based software applications based on the characterization graph of the plurality of vision based software applications.

* * * * *